July 21, 1936.　　　A. RONNING　　　2,048,141
CROP HARVESTING APPARATUS
Filed June 10, 1935　　　8 Sheets-Sheet 1

Fig. 1.

INVENTOR
ADOLPH RONNING
BY
ATTORNEY

INVENTOR
ADOLPH RONNING
BY
ATTORNEY

July 21, 1936. A. RONNING 2,048,141
CROP HARVESTING APPARATUS
Filed June 10, 1935 8 Sheets-Sheet 7

INVENTOR
ADOLPH RONNING
BY
Andrew E. Carlsen
ATTORNEY

Patented July 21, 1936

2,048,141

UNITED STATES PATENT OFFICE 2,048,141

CROP HARVESTING APPARATUS

Adolph Ronning, Minneapolis, Minn.

Application June 10, 1935, Serial No. 25,833

18 Claims. (Cl. 56—16)

This invention relates to means and methods for harvesting standing crops, and the primary object is to provide an arrangement of working units which are so designed and correlated with respect to each other that they may cooperate to harvest a crop with a maximum of speed and efficiency and with a minimum amount of manual effort and mechanical power, machinery, and operating expense.

The machine herein disclosed embodies a primary cutting or harvester unit of the type such as generally used for harvesting corn or other so-called row crops. Except where otherwise indicated, however, the term "harvester" includes cutters, pickers, mowers, and all other forms of crop gathering machines, and the term "crop" will be understood to embrace any plant element or product which is to be removed from a field and conveyed to some remote place either for food, animal fodder, or other purposes. Thus the invention contemplates not only the removal and transport of human and animal food crops, but also contemplates the removal, reduction, and disposal of the remaining plant or stalk parts for commercial conversion into such products as fuel, wall board, paper, packing materials, fertilizers, and numerous chemical products or byproducts, depending upon the character of roughage being harvested or gathered.

Recent years have witnessed numerous advances in the art of harvesting primary crop products such as corn, cotton, etc., and the present invention, which I have developed, thoroughly tested, and compared, still further advances this art as will presently be shown. I wish to also stress, however, the value of the invention from the standpoint of harvesting the secondary or roughage crop.

It has, for instance, long been recognized that roughage crops of various kinds contain ingredients capable of conversion to various industrial uses, including particularly compressed wall board, paper making, chemical products, etc., but such roughage conversion has heretofore been retarded or rendered unprofitable because of the difficulty and expense of gathering and transporting the roughage material, with a result that literally millions of tons of roughage crop are annually wasted in the United States alone.

In recent years the practice of cutting and reducing the entire crop plant for silage purposes has also become popular. This is particularly true of corn crop in which event a traveling harvester severs the stalk from the field and then cuts the entire plant, including stalk, ears, and leaves, into small particles, which are then loaded into wagons or trucks and transported to a silo where the entire heterogenous mass is stored for green fodder feed throughout the winter season. This method of harvesting has been quite fully developed by Andrean G. Ronning (now deceased) and myself, as evidenced by the following issued United States Letters Patents Nos. 1,161,-252; 1,257,403; 1,340,461; 1,485,201; 1,485,532; 1,528,635; 1,532,266; 1,533,902; 1,658,353; 1,660,-767; 1,699,251; 1,699,252; 1,700,421; 1,815,273; 1,815,274; 1,815,587; and 1,883,402. Of these patents, Fig. 1 in Patent No. 1,815,274 is typical of an arrangement now in commercial use and shows a harvester attached to one side of a tractor, with a conveyor for delivering the cut ensilage into a vehicle drawn along at the other side of the tractor. This arrangement, while far superior to prior devices, has various objections, not the least of which is the fact that the system requires the use of a plurality of operators and trucks (or wagons), not always available, particularly on small farms. Furthermore, the tractor remained idle for considerable periods of time during the harvesting process because of the delays in replacing filled wagons and trucks for empty ones, and especially when the harvester cutting capacity exceeded the number or total load capacity of conveying vehicles. Exhaustive tests carried on under cost accounting methods show that the expense of harvesting and transporting corn ensilage and corn stalk roughage with an equipment combination as herein disclosed has been reduced to less than thirty cents (30¢) per ton. This very low production cost not only represents a saving to the farmer, but because of one-man operation for the entire process and reduction in equipment units required makes the system available to small farms and renders possible the harvesting of roughage on a profitable scale. It is of course apparent that, as with silage, the reduction of roughage to small particles further facilitates its handling in mechanical conveyors, bulk treatment, processing, and transportation either to a farm or community processing plant.

Attention may here also be directed to the structure evidenced by Ronning and Ronning Patent No. 1,883,402, in which is disclosed a harvesting machine wherein a tractor is employed to propel and operate a harvester unit which is incorporated in the load transporting vehicle. This arrangement has various advantages over the system described, wherein individually powered transport vehicles are used, but has the disadvantage that the harvester unit must be hauled idle, off and back onto the field, with each load transporting trip of the tractor and load receptacle.

In the present apparatus I provide a harvester arranged to be drawn by and preferably at the rear and at one side of the tractor, the tractor power also being employed to operate the harvester. A receptacle is placed upon the tractor to carry the cut load off of the field, at which time the harvester, being independently supported, is disconnected in operative position so that cutting can be resumed immediately upon return of the power unit. Connection and disconnection of the tractor and harvester is automatically effected by movement manipulation of the tractor. A crop elevating unit is arranged near the silo, processing plant, or other housing that is to receive the crop, and is designed to conveniently receive the crop products dumped into it from the tractor supported receptacle. A quickly releasable power transmission device is operative to connect the power take-off shaft of the tractor with the harvester mechanism, during the cutting and loading operation, and with the elevating unit, during the silo filling operation. Thus one power plant supplies power for each harvesting operation, including the hauling, and only one man is needed to carry on all of the various phases of harvesting. If other power for operating the elevator is more conveniently available, then the tractor can of course be immediately returned to the field after having discharged its crop load. Ordinarily, however, there is a substantial advantage in being able to utilize the same power unit for all purposes.

In addition to the general arrangement, combinations of features, and harvesting method improvements as thus broadly indicated as contemplated by this invention, I further disclose various mechanical and structural improvements in the various operating units employed. Thus I provide a receptacle structure and mounting for the tractor that is so designed that while comparatively light in weight is sufficiently strong to carry heavy loads, that is arranged and braced with respect to the tractor body so as to distribute and direct the load weight where it can best be absorbed, and also include a simple and efficient dumping device. In thus mounting the receptacle I have also rearranged the operator's station and provided an auxiliary tractor control operable therefrom, thereby giving the operator full body clearance and without materially obstructing his line of vision forwardly of the machine. I have further devised a novel design of automatic tractor hitch mechanism, releasable power take-off connection, detachable elevator transmission, and other features, all to be brought out in the following detailed specification.

In the accompanying drawings, which illustrate a preferred embodiment of the invention.

Figure 2:
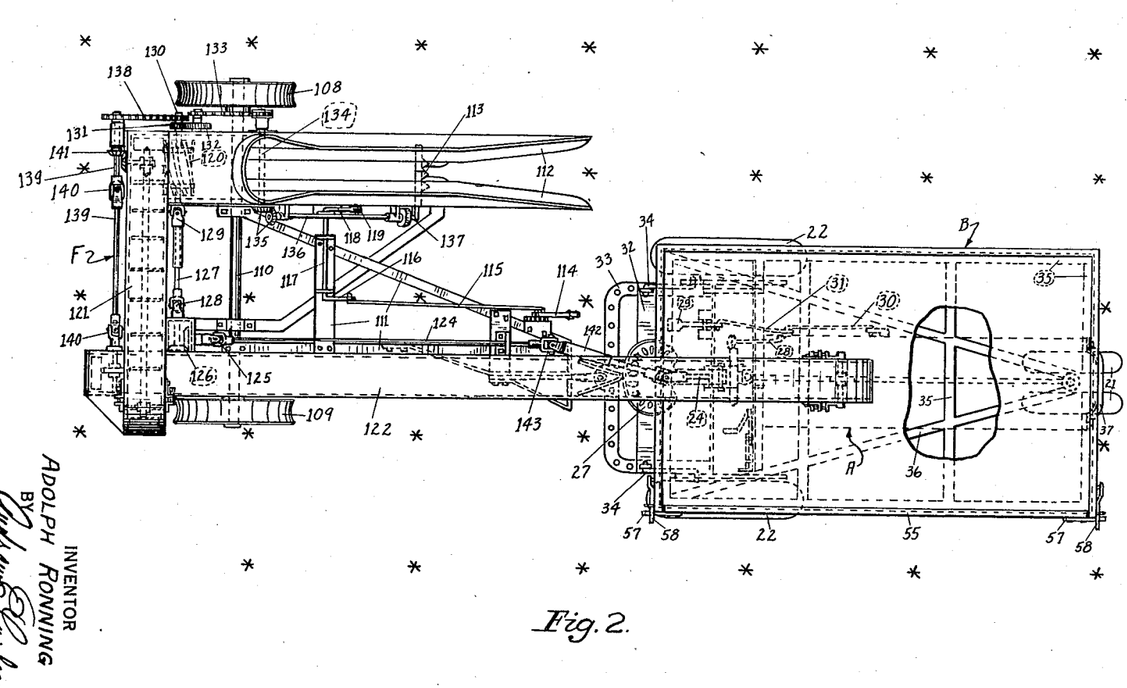
Fig. 2 is a top or plan view of the connected units shown in Fig. 1.
Figure 3:
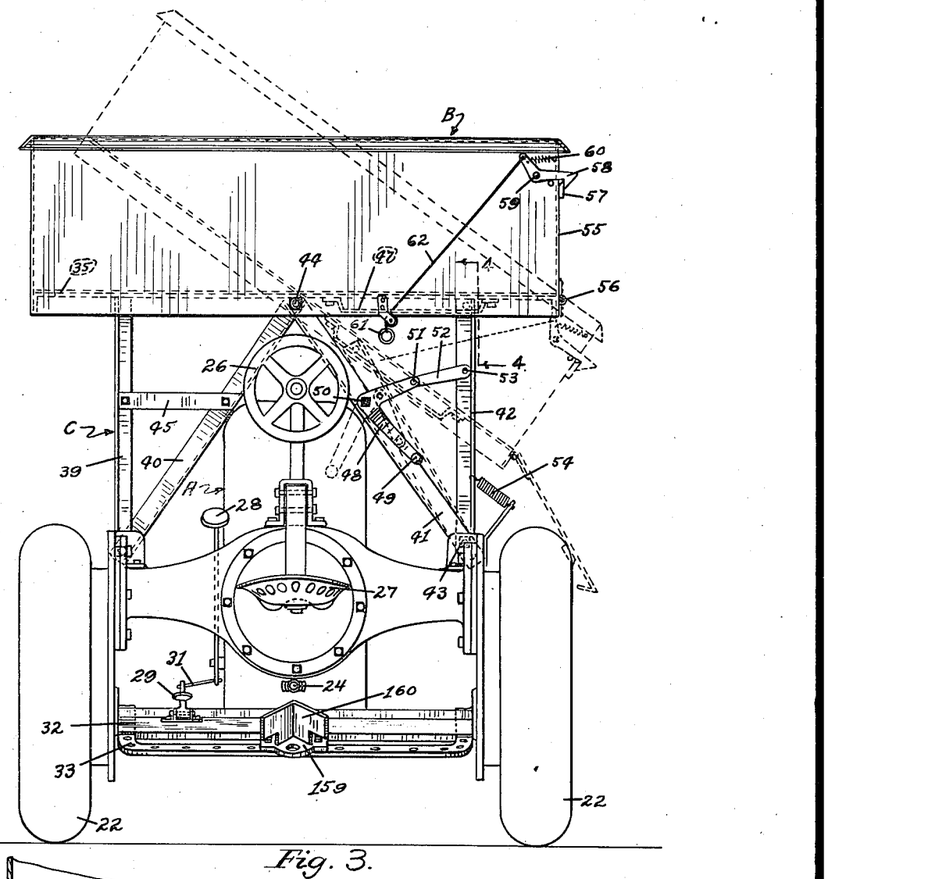
Fig. 3 is an enlarged rear elevation of the tractor, with transporting receptacle mounted thereon, and showing the receptacle supporting and dumping devices.
Figure 4:
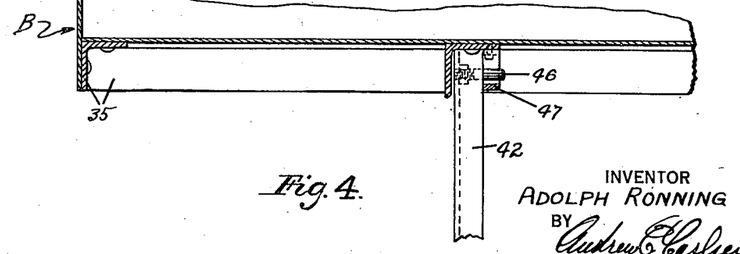
Fig. 4 is an enlarged detail section through a part of the tractor receptacle, as on the line 4—4 in Fig. 3.

Referring to the drawings more particularly and by reference characters, A designates generally a tractor which may be of any suitable make or design but is preferably of the type designed for row crop cultivation and similar agricultural work. To this end it is customary to support the front end of the tractor on a narrow steering truck 21 that may travel between two crop rows, as shown in Fig. 2, and widely spaced rear wheels 22 for straddling the same crop rows. The wheels are all preferably provided with pneumatic tires, which, supplemented by relatively high speed engine transmission, as is now becoming common practice, is conducive to the use of the tractor for load transporting purposes and over roads and highways. The tractor is powered by an engine 23, having a rearwardly extending power take-off shaft 24; and the front truck 21 is steered through any suitable mechanism 25 having a hand wheel 26 within convenient reach of an operator stationed on the seat 27. In the present instance the seat 27 has been dropped down to give adequate head clearance for the tractor operator. But even in this position he has within convenient reach all of the essential tractor controls (many of which are omitted), and it may here also be noted that the receptacle supporting frame work is so designed that it will not materially obstruct the operator's vision of the field and crop ahead of the machine.

Figure 1:
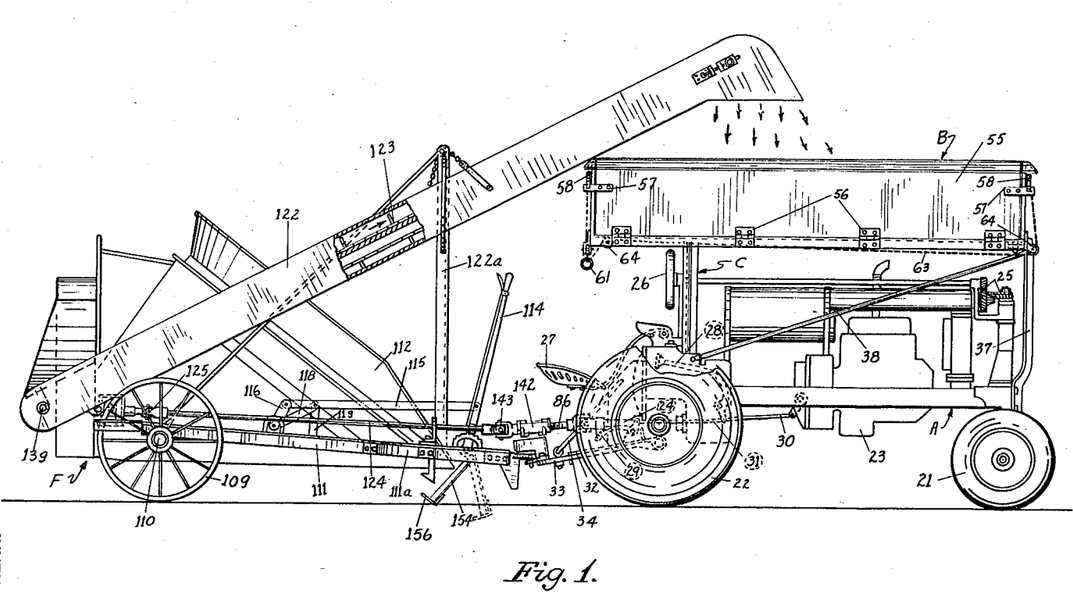
Fig. 1 is a side elevation of the tractor and harvester units connected, when cutting and loading crop, as seen from the right, and with various parts broken away for purpose of illustration.
Figure 8:
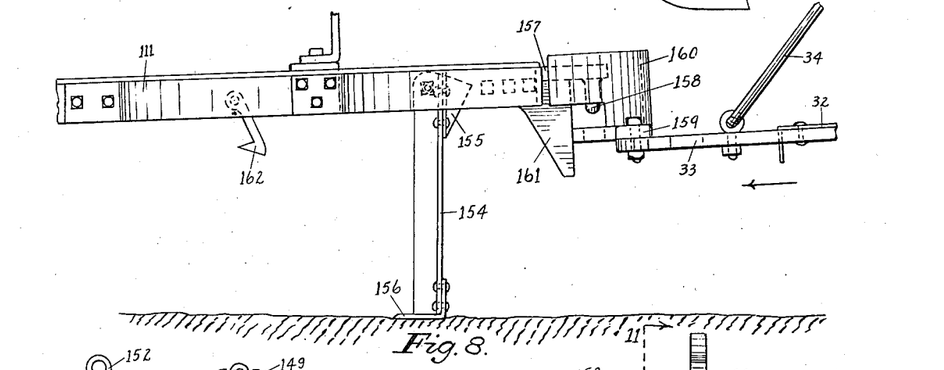
Figure 9:
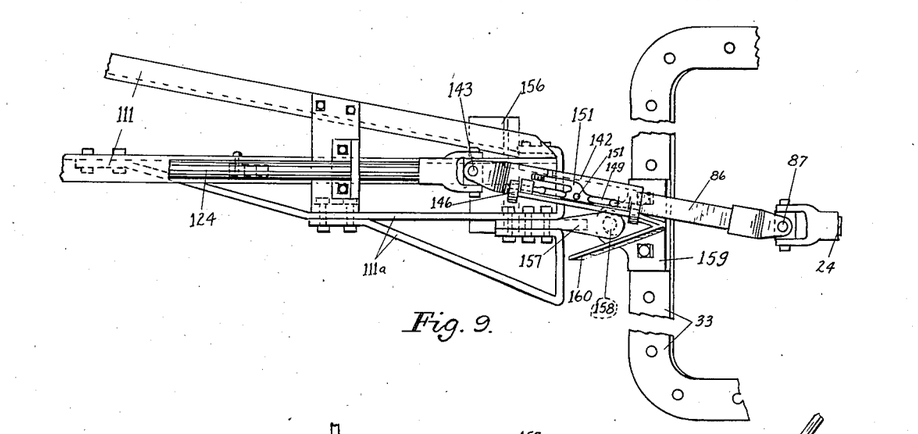
Fig. 9 is a plan view of the hitch and power transmission fully connected as shown in elevation in Fig. 7.

To facilitate and make more convenient the tractor speed transmission changes, I have supplemented the usual clutch pedal 28 with a second or auxiliary pedal 29, connected to the usual clutch rod 30 by an extension rod 31. This pedal 29 is in a lower, more convenient position, and is preferably mounted on a foot platform 32, in turn secured to the wide, perforated, generally U-shaped draw bar 33 of the tractor, which draw bar extends rearwardly and below the level of the tractor power take-off shaft 24. The draw bar 33 and platform 32 may be supported in operative position by side links 34 (Figs. 1, 2, and 8).

The tractor receptacle, designated generally by letter B, is preferably formed of sheet metal secured on a skeleton framework including edge, corner, and cross pieces 35, all firmly connected, and further includes forwardly converging truss bars 36 which extend diagonally under the receptacle and are rigidly secured, as by welding, to the bottom cross pieces so as to not only provide vertical or load support but also to convert torsional load stresses to the rear supporting frame where such stresses can be most efficiently absorbed.

Figure 14:
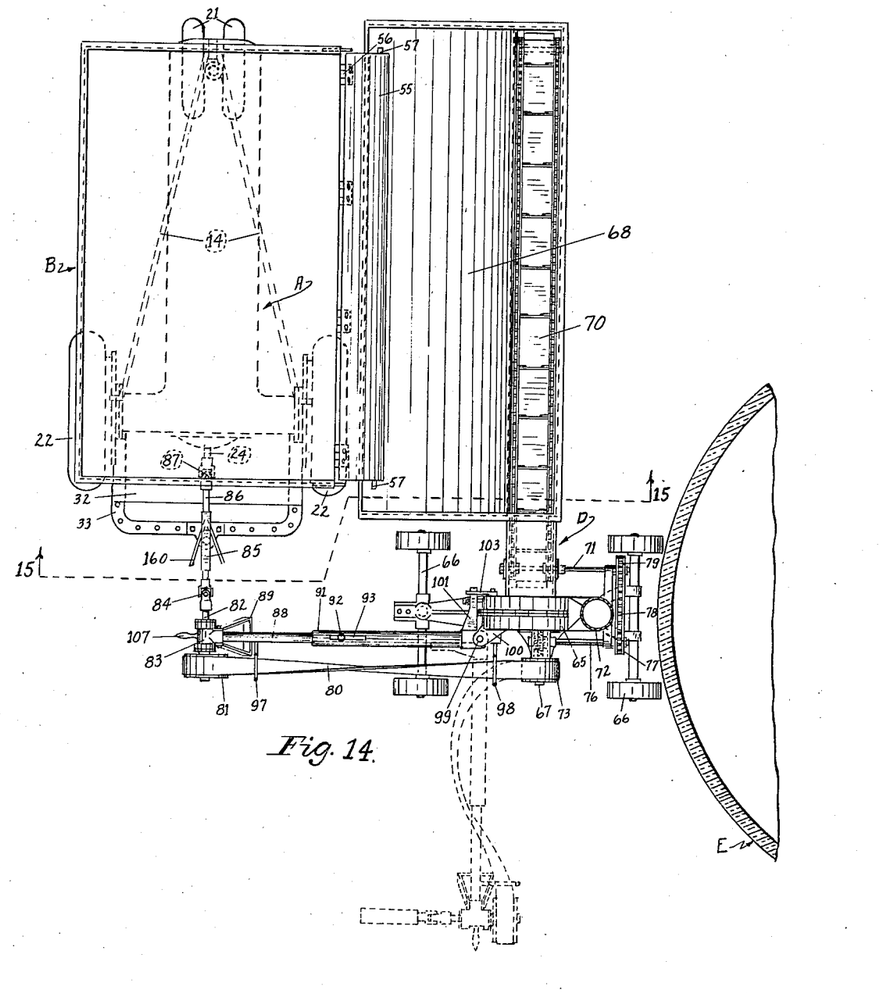
Fig. 14 is a plan view of the crop elevator, or silo filler, and shows the tractor and its transporting receptacle in delivery position with respect to the receiving hopper of the elevator.
Figure 15:
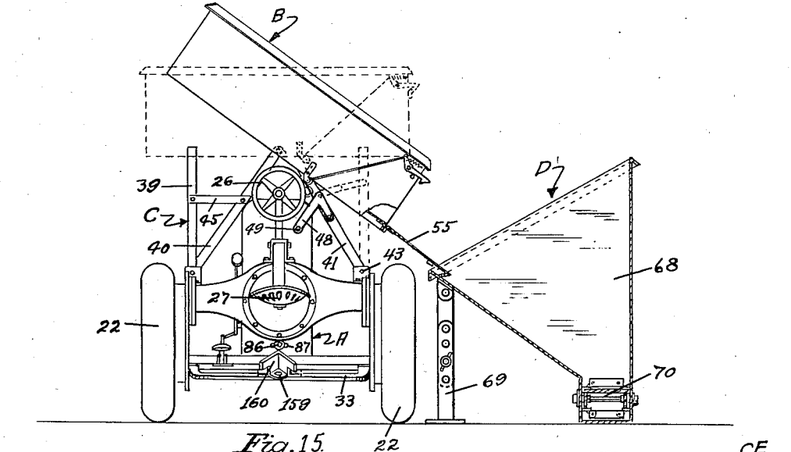
Fig. 15 is a rear elevation of the tractor, with its receptacle in dumping position, a portion of such receptacle and the hopper of the elevator being in section as on the line 15—15 in Fig. 14.
Figure 16:
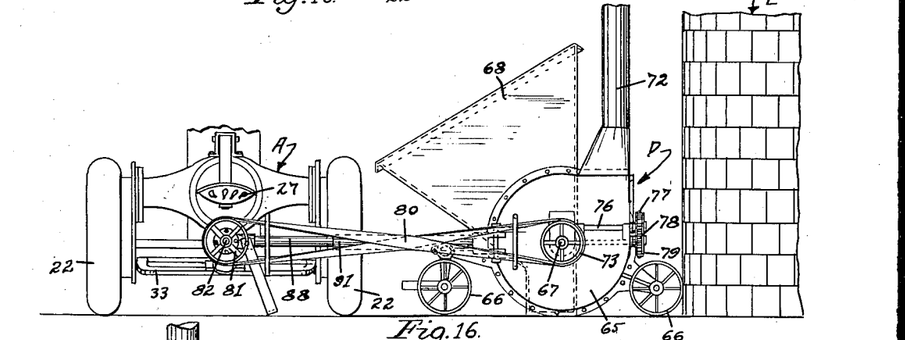
Fig. 16 is a rear view of the elevator (as seen from below in Fig. 14), and showing the power take-off connection from the tractor.
Figure 17:
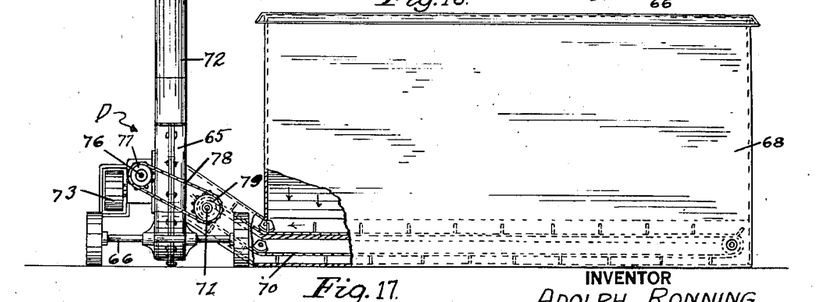
Fig. 17 is an elevation of the elevator and its receiving hopper, as seen from the right or silo side in Figs. 14 and 16.

The front end of the receptacle A is supported by a central pivot connection to a narrow frame or standard 37 mounted on the front end of the tractor, so that the receptacle can tilt on a longitudinal axis as shown in Fig. 15. The standard 37 is braced with respect to the rear of the tractor by two diverging, inclined brace rods 38 (Figs. 1 and 14) which thus convert lateral and twisting stresses to the heavier and more widely supported rear end of the tractor body.

The rear end of the receptacle is supported directly over the rear of the tractor by a framework C, including a fixed, left upright bar 39, a pair of fixed, upwardly converging bars 40 and 41, and a right side upright bar 42 which is pivoted to the tractor as at 43 for swinging movement in a transverse vertical plane.

The upper adjoining ends of the bars 40 and 41 are connected by a bolt 44 which serves as the rear pivot support for the receptacle B, and is in alignment with the pivot support at the front end of the receptacle to provide for the necessary tilting action. The support bar 39 is rigidly connected by a link 45 to the bar 40, and the left side of the receptacle merely rests upon the top of the bar 39 when the receptacle is in its normal horizontal position. The upper end of the bar 42 is slidably engageable with the receptacle, this sliding engagement being defined by a pin 46 which projects rigidly from the bar 42 for sliding engagement in a guide strip 47 secured upon the under side of the receptacle and transversely thereof.

A bell crank lever 48, having a handle 49, is pivotally mounted upon the bar 41 as at 50, and one arm of the bell crank lever is pivotally connected as at 51 to a link 52, the opposite end of which is pivotally attached to the bar 42 as at 53. A spring 54 is arranged to yieldably hold the bar 42 in its outward, normally vertical position, and in which position the bar forms a vertical support for the right side of the receptacle in exactly the same manner as the bar 39 supports the left side, and when in this position the pivot 51 is preferably above the dead center line between pivot points 50 and 53 so as to thereby releasably lock the bar 42 in its receptacle supporting position. When it is desired to dump the receptacle by tilting it to one side, the operator merely grasps the handle 49 and moves it inwardly or to the left, which action will jack knife the toggle connection 48, 51, 52, and thereby force the bar 42 inwardly with the pin 46 traveling in the guide strap 47 until the parts reach the position indicated in Fig. 15, at which time the receptacle is in the tilted position. Under certain circumstances it may be desirable to provide for tilting of the receptacle to the left side of the tractor, in which event the link 45 is secured between the bars 41 and 42 and the leverage mechanism 48—52 is then applied to the bars 39—40 at the left side of the machine. In this event also the sliding connection 46—47 will of course also be applied to the left side of the receptacle.

The right side wall 55 of the receptacle is pivotally secured thereto at its lower edge by hinges 56, and the ends of the side wall 55 are provided with lugs 57 which engage under latch hooks 58 that are pivoted as at 59 to the end walls of the receptacle, and are normally held in engagement with the lugs by springs 60. When it is desired to dump the receptacle the operator, in order to release the side wall 55, pulls a ring 61 at the end of a cord 62 connected with the latch 58 at the rear end of the receptacle. A similar latch 58 at the front end of the receptacle is released by a cord 63, which passes over pulleys 64, and also connects with the pull ring 61. Thus by pulling the ring 61 the operator releases both latches 58 and permits the side wall 55 to open under the pressure of the material being dumped. It may be noted with particular reference to Figs. 14 and 15 that the hinged wall 55 of the receptacle is so disposed and proportioned with respect to the hopper of the elevator unit D, presently to be described, that it serves as a connecting chute between the receptacle B and such hopper.

The elevator unit D is of the general portable type disclosed in the Ronning and Ronning Patent No. 1,490,404, issued April 15th, 1924, for Pneumatic elevator, and includes a fan housing 65 mounted on a truck 66 so that the unit may be transported from place to place. In the present instance it is shown as positioned adjacent the silo E for purpose of illustration, but which might be considered representative of a treating chamber or processing plant. The fan is of the centrifugal type, and is driven by a shaft 67 extending axially thereof and through the housing 65. In one side of the blower there is positioned a large receiving hopper 68 which, as shown, rests upon the ground and has an adjustable lateral support 69 (see Fig. 15) to prevent the hopper from tilting. An endless conveyor 70 operates longitudinally in the bottom of the hopper 68, and at one end of the hopper has an inclined run travelling up over a shaft 71 so that the material dumped into the hopper will be conveyed longitudinally thereof and upwardly into a central opening in the fan housing 65. Within the housing the material is then engaged by the fan which blows it up through an outlet spout 72 for delivery into the silo or processing chamber E.

The fan shaft 67 is rotated by a pulley 73 mounted thereon, and power is conveyed from the shaft 67 to the shaft 71 under reduced speed through a worm 74, a worm gear 75, a shaft 76, sprocket pinion 77, sprocket chain 78, a sprocket pinion 79, the latter being secured on one end of the shaft 71. The pulley 73 is driven by a belt 80 which also passes over a drive pulley 81 mounted on a shaft 82 which extends through and rotates in a bearing hub 83. The opposite or forward end of the shaft 82 is connected by a universal joint 84 to a coupling socket 85 which is opened at one end to slidably receive a square shank 86 (see Fig. 14) connected by universal joint 87 to the power take-off shaft 24 of the tractor. The bearing hub 83 is secured upon the outer end of a rod or pipe 88, and is additionally supported from the ground by a leg frame 89 which is preferably pivoted to the bearing casting 83 as at 90 so that by slightly inclining the leg frame 89, as indicated in Figs. 18 and 19, slight vertical adjustment of the assembly 81—84 may be made.

The pipe 88 is slidably secured in a sleeve or tube 91, the sliding action being limited by a pin 92 secured in the pipe 88 and operating in slots 93 in the sleeve 91. The pipe 88 is normally held in a projected position by a compression spring 94 disposed within the sleeve 91 and acting upon the inner end of the pipe 88. The opposite end of the spring stops against a pin 95 selectively insertable in various perforations 96 (Fig. 18), whereby the tension of the spring may be regulated. It may here be noted that the pipe 88 carries a frame 97 at its outer end and adjacent the pulley 81 through which the belt 80 passes and is guided. A similar frame 98 is secured to the fan housing 65 to receive and guide the rear portion of the belt adjacent the pulley 73. The rear end of the sleeve 91 is pivotally secured as at 99 between a pair of lugs 100 extending integrally out from the housing 65; and adjacent the pivot bolt 99 the member 91 is provided with a laterally extending arm 101 which is provided with an adjustable set screw 102 for stopping engagement with a portion of the fan housing 65. The arm 101 is also engageable with an angularly formed latch 103 which is pivoted to the casing 65 as at 104, and has a depending arm portion which is connected by a wire or cable 105 to a finger lever 106 that is fulcrumed to the bearing hub 83 immediately adjacent to a handle 107 which is fixed in the hub.

The purpose of the foregoing construction is to provide means for quickly and easily connecting and disconnecting the elevator unit with respect to the power take-off shaft of the tractor after the tractor has been moved into the dumping position with respect to the elevator hopper 68. Thus in order to permit the tractor to be driven forwardly into load dumping position, the operator grasps the handle 107 and releases the latch hook 103 by a pulling on the hand lever 106. By slightly lifting on the handle 107 the telescopic beam 88—91 can then be swung on the pivot 99 to one side, as indicated by the dotted lines in Fig. 14, to permit the tractor to be driven into place. Meanwhile the guide frames 97 and 98 serve to prevent disengagement of the belt 80 from the pulleys 73 and 81.

Figure 18:
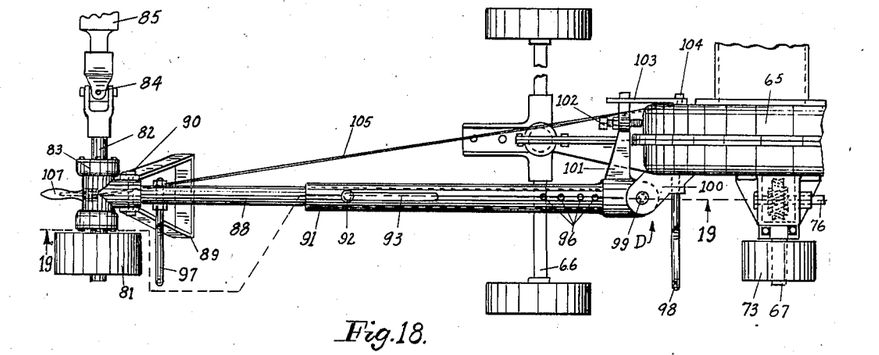
Fig. 18 is an enlarged detail plan view of tractor-elevator power connection, with transmission belt omitted.
Figure 19:
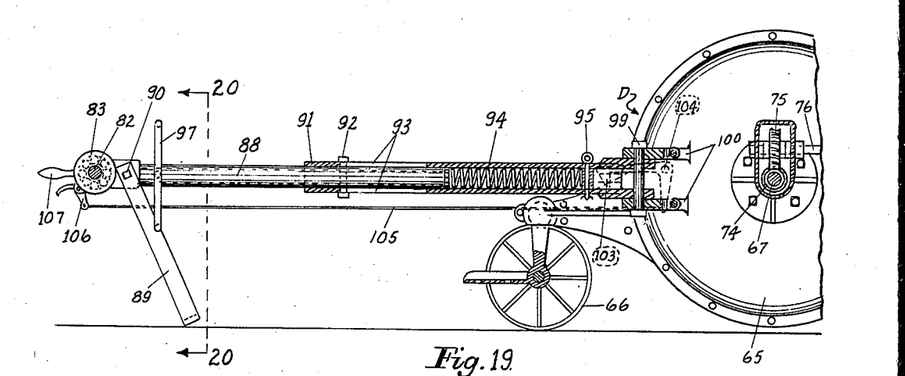
Fig. 19 is a sectional elevation on the irregular line 19—19 in Fig. 18.
Figure 20:
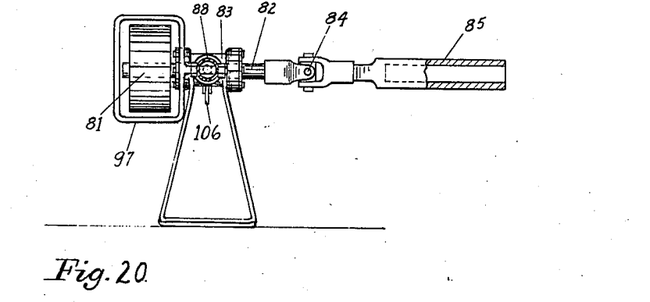
Fig. 20 is a sectional elevation on line 20—20 in Fig. 19.

To establish the power connection between the tractor and the elevator, after the tractor has been driven into dumping position, the operator again grasps the handle 107 and restores the telescopic beam 88—91 to the full line position shown in Figs. 14 and 18, and while doing so inserts the shank 86 into the open end of the coupler 85 so that rotation of the power take-off shaft 24 will be transmitted through the parts 87, 86, 85, and 84 to the pulley shaft 82, it being understood that the universal joints 84 and 87 will allow for a considerable freedom of movement when making the connection, and also compensates for differences in ground level upon which the tractor and elevator units may be standing.

When restoring the power transmitting units to their normal operative positions the operator also partially compresses the spring 94 so as to establish the necessary tautness in the belt 80, thus eliminating the necessity of any additional belt tightener; and as the beam 88—91 is swung into place it engages under the latch 103 which thus secures the beam in place and prevents any lateral displacement thereof either accidentally or through the action of the spring 94.

After the load has been dumped and the elevator unit D has done its work in elevating the same, the operator needs only to lift one side of the receptacle B to restore it to its normal receiving position, and also of course closes the side wall guide 55. To disconnect the tractor from the elevator it is only necessary to drive away, at which time the shank 86 will pull out of the coupling socket 85, leaving the latter connected to the universal joint 84 until the next power connection with the elevator unit is to be made.

The crop or roughage gathering machine here designated generally by the letter F may be of various types and for gathering different kinds of crop, as previously noted. In the present instance I have disclosed a harvesting machine such as used for cutting and reducing a crop such as corn into ensilage, and this machine may be described as follows:

The machine is primarily supported on a pair of laterally disposed ground wheels 108 and 109 connected by a transverse axle 110. A draft frame 111 extends forwardly from the axle 110, and its front end is adapted to be supported by the rear end of the tractor, and be pulled in trailing arrangement therebehind. The draft frame is connected to the tractor by a mechanism presently to be described, which automatically couples and uncouples the tractor with respect to the harvester.

The harvester further includes a pair of gathering frames 112, which are disposed in an offset position with respect to the tractor so as to travel over and receive between themselves a crop row as indicated in Fig. 2. The gathering frames 112 are tiltable with respect to the draft frame 111 so that the level or height of the crop engaging device here shown as a primary cutter 113 may be regulated. This vertical adjustment is accomplished through the manipulation of a lever 114 which is within convenient reach of the operator stationed on the seat 27, and is connected by a rod 115 to the arm 116 of a shaft 117, the opposite end of which has an arm 118 connected to the gathering frame assembly by a link 119. Thus by releasing and moving the lever 114 the operator is able to raise and lower the forward part of the gathering frames including the primary cutting knives 113.

As the stalks or other crop is severed from the field by the cutters 113, the crop is moved rearwardly by gathering chains (not shown), and into a secondary cutter 120 which cuts the crop into small particles, which particles are then delivered into one end of a transverse conveyor 121 which conveys the material to the other side of the machine and drops it into the lower rear end of a conveyor housing 122 within which operates an endless conveyor 123. This conveyor carries the crop particles upwardly and forwardly to a delivery point directly over the receptacle B on the tractor so as to load the same, the housing 122 being adjustably supported by a standard 122a.

A primary power shaft 124, disposed in a parallel position with respect to the draft frame 111 is connectible at its forward end with a power take-off shaft 24 of the tractor, and at its rear end drives through a universal joint 125 and a pair of bevel pinions 126 to actuate a cross shaft 127. This shaft 127 is telescopic in character and has a pair of universal joints 128 and 129. A shaft 130 extends from the universal joint 129 through the rotary cutter 120 so as to operate the same, and at its outer end has a spur pinion 131 for driving a spur gear 132 which in turn has a sprocket connected by a sprocket chain 133 to a shaft 134 which extends through the gathering frame unit. At its inner end the shaft 134 operates through bevel pinions 135 to rotate a shaft 136, the lower end of which has an eccentric pitman 137, or other suitable connection, for reciprocating the primary cutting knives 113. The shaft 130 is further provided at its outer end with a sprocket chain connection 138 for operating a shaft 139 extending transversely of the machine and rearwardly of the conveyor 121. This shaft 139 is provided with universal joints 140 and operates through bevel pinions 141 to actuate the conveyor 121. One end of the shaft 139 also extends into the housing 122 for the purpose of driving or operating the endless conveyor 123. Thus it will be seen that power is transmitted from the tractor to all essential working parts of the harvester unit.

Figures 10, 11, 12, 13:
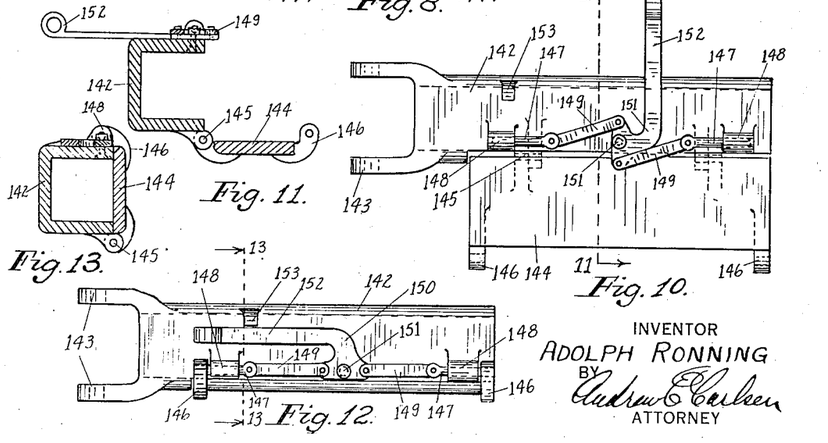
Fig. 10 is an enlarged detail plan view of the socket coupler employed in the power transmission connection, the coupler being shown open.
Fig. 11 is a sectional elevation on the line 11—11, Fig. 10.
Fig. 12 is a plan view of the coupler shown in Fig. 10, but closed and locked.
Fig. 13 is a sectional elevation on the line 13—13 in Fig. 12.

The forward end of the primary power shaft 124 is detachably connected to the shaft shank 86 by a coupler housing 142, which is attached to the shaft 124 by a universal joint 143, and has a socket or chamber that is square in cross section, as indicated in Fig. 13, the opening being of the same size as that in the socket coupler 85 of the elevator unit so as to be conveniently interchangeable therewith. It is not convenient, however, to insert the shank 86 endwise into the coupler 142 as is done with the coupler 85, because it is preferable to first connect up the tractor harvester hitch before establishing operative connection between the shafts 24 and 124. For this reason the coupler 142 is designed so that one side wall 144 thereof is hingedly attached to the remaining portion as at 145, and is provided at the edge opposite from the hinges with a pair of perforate lugs 146 for receiving a pair of lock bolts 147 that are slidable in lugs 148 of the coupler housing, and are connected by links 149 to a lever 150 that is pivoted to the coupler as at 151, and has an operating handle 152 adapted to snap into locked position with respect to a lug 153 formed integrally with the coupler housing.

To operatively connect the members 86 and 142 the side wall or cover 144 is first opened, whereupon the shank 86 may be placed by a lateral movement into the coupler socket, the locking mechanism in the meantime being in the position indicated in Fig. 10. After the shank 86 has thus been placed into position the plate 144 is swung closed, thereupon bringing the lugs 146 into alignment with the lock bolts 147. The lever handle 152 is then swung over to the position indicated in Fig. 12, thereby projecting the bolts 147 into the lugs 146 to lock the plate 144 in closed position. The lever handle 152 is preferably made of material that may be flexed slightly so that it may pass over the lug 153, and is releasably locked in this position until the lever handle is first lifted sufficiently so that it can be moved over the lug 153.

From the foregoing it will be seen that a very simple and efficient device is provided for establishing driving relation between the power take-off shaft of the tractor and the primary driving shaft 124 of the harvester, and that this connection can be made after the harvester has been hitched to the draw-bar of the tractor.

The automatic hitch between the tractor and harvester is illustrated in Figs. 1, and 5 to 9 inclusive, and may be described as follows:

The forward end of the harvester drive frame 111 is provided with a supporting leg 154 which is pivotally attached at its upper end to the vertical flange of the main drive frame beam so that it may be swung rearwardly, but its forward movement is checked by a lug 155 which stops against the horizontal flange of the beam to which the leg is attached. To the lower end of the leg is rigidly secured an angle iron cross piece or foot 156 which rests flat upon the ground when the leg is in a vertical position, as shown in Fig. 8, and which will also support the leg when it is in a slightly rearwardly inclined position, as indicated in Fig. 5, which figure also indicates the rearmost position of the leg.

At the forward end of the drive frame 111 there is rigidly secured an auxiliary frame or lateral extension 111a, which includes a forwardly extending bar 157 having a depending pin 158 for engagement in a perforated bracket 159 rigidly secured to the draw bar 33 of the tractor. This bracket 159 has an angular or V-shaped extension 160, the purpose of the wings of which is to guide the bar 157 centrally into position so that the pin 158 may drop into the hole in the bracket 159. Extending downwardly from but rigidly secured to the bar 157 is a push plate 161 against the forward edge of which the bracket 159 may contact when the parts are in the position shown in Fig. 8.

Figure 7:
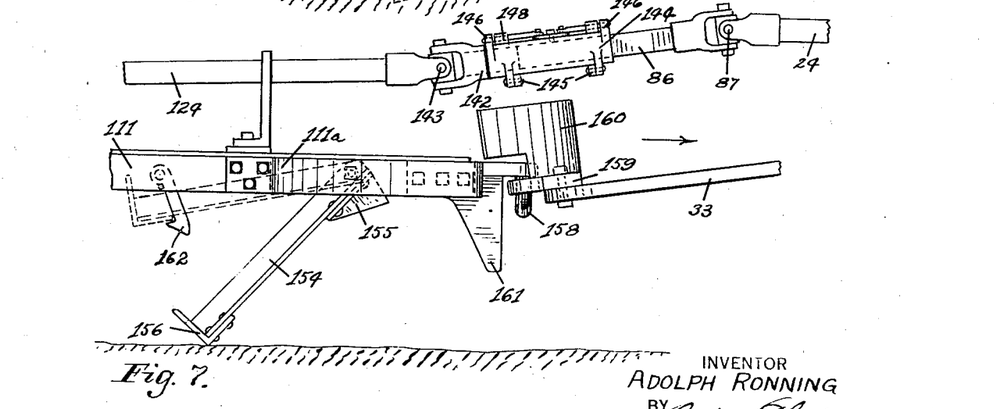

At a rearward point the draft frame 111 of the harvester is provided with a latch hook 162 which is so arranged that it may be used to hold the leg 154 in a raised and inactive position, as indicated by the dotted lines in Fig. 7. The leg is secured in this position when it is desired to establish a more permanent connection in the tractor harvester hitch. Under normal working conditions, however, the leg 154 merely drags on the ground in a rearwardly inclined position, as shown in Figs. 1 and 7.

Figure 5:
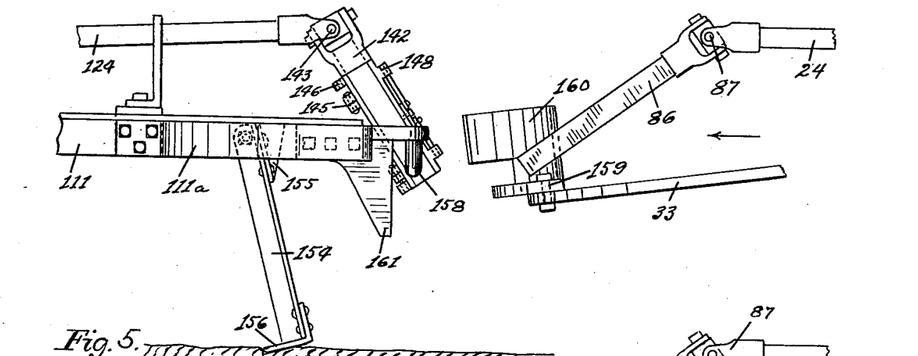
Figs. 5, 6, 7, and 8 are all enlarged detail side elevations of the automatic tractor-harvester hitch, showing various parts thereof in the different positions assumed during the connecting and disconnecting operations.

When it is desired to disconnect the tractor, as for instance when the receptacle B has been filled and is to be conveyed to a point of discharge, leaving the harvester behind, then it is only necessary for the tractor operator to reverse or back up the tractor, whereupon the leg 154 will move into the position shown in Fig. 5, at which time the pin 158 is entirely lifted from the bracket 159 and remains in this lifted position when the rearward tractor movement stops, as it is held at this elevation by the more vertical position of the leg 154. The operator now merely drives the tractor forward, as the hitch is entirely disconnected, and when doing so the power shank 86 merely pulls out of the coupler 142 so that these two members will drop into the positions shown in Fig. 5.

Figure 6:
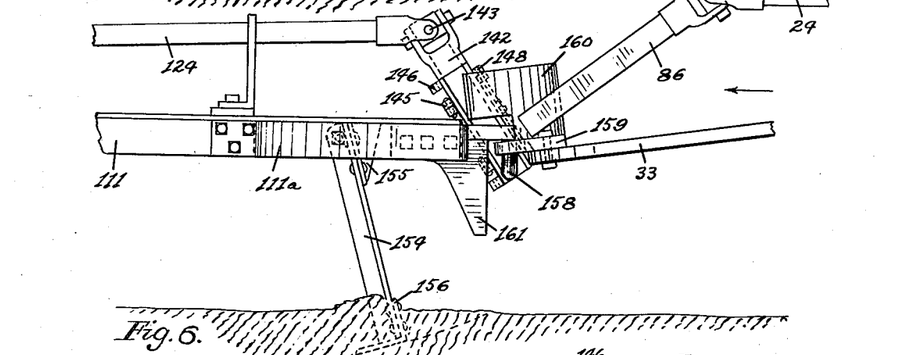

When the operator now returns the tractor to the harvester, and desires to reestablish the hitch connection, he merely backs the tractor up until the bar 157 reengages the bracket extension 160 to thereby center the pin 158 over the hole in the bracket proper. The rearward movement is then continued, whereupon the bracket 159 engages the push plate 161, as indicated in Fig. 8, and then continues to move the tractor backward a short distance so as to push the foot 156 down into the earth in an inclined direction, as indicated in Fig. 6. As the foot thus moves downwardly into the earth, the draft frame 111 following with it, is also lowered until the pin 158 reengages the bracket 159, thereby reestablishing the pull connection. After this has been done the operator again drives forwardly, whereupon the leg 154 will pivot on the foot 156, and thus slightly raise, but inasmuch as the foot pivots at a level under the ground surface it does not raise the draft beam sufficiently to disengage the pin 158 from the bracket 159. Consequently, as the machine continues to move forward the leg 154 will assume the dragging position, as shown in Figs. 1 and 7.

While the operation of the machine is no doubt understood from the foregoing description, a brief résumé is as follows:

With the tractor and harvester operatively connected, as shown in Figs. 1 and 2, the combined vehicle is driven over the field in such a manner that the crop row will enter the gathering frames 112. At such time the front truck 21 of the tractor will travel between two adjacent rows of crop while the rear wheels 22 will span such rows. As the crop passes into the gathering frames it is first severed from the field by the primary cutter 113, and then passes into the secondary cutter 120, which cuts it up into small pieces or particles. The crop mass thus formed is carried by the conveyor 121 transversely of the machine and is deposited in the boot of the conveyor housing 122, and the endless conveyor 123 then carries the crop up through the housing 122 and deposits it in the receptacle B as indicated by the arrows in Fig. 1. Ordinarily it is preferable to slightly space the housing 122 from the rear end of the receptacle B so that there will be no bumping contact between the two, and this can be accomplished by the suspension adjustment of the conveyor with respect to the standard 122a.

When the receptacle is sufficiently filled the operator then stops the machine, and by backing up tractor disengages the hitch device just described, and then drives off the field, pulling the power shaft shank 86 out of the drive shaft coupler 142. When the tractor vehicle then reaches the silo treating plant or processing apparatus, into which the crop is to be placed, it is driven up along side of the hopper 68 of the elevator unit D, the beam 91 being first swung into the inoperative position shown by dotted lines in Fig. 14. Upon reaching this location the operator then manipulates the handle 49 and pull ring 61 to tilt the receptacle B and open the side wall 55 so that the crop will be discharged into the hopper 68. He then supplies tractor engine power to the elevator unit D by swinging the beam 91 over into its operative position, and when doing so guides the power shank 86 of the tractor endwise into the coupler 85. The beam 91 is releasably locked in operative position by the latch member 103. When the clutch for the power take-off shaft of the tractor is now engaged, power will be transmitted through the shaft 82 and through the belt 80 to drive the elevator fan and conveying mechanisms.

When the crop load has been disposed of the operator closes the side gate 55 of the receptacle B and restores the receptacle to its normal horizontal position where it will remain until the release lever 48 is again actuated. The tractor is then driven back to the harvester, the power shank 86 slipping out of the coupler 85, and upon reaching the harvester the tractor is backed into it, reestablishing the hitch connection; and when this is done the side plate 144 of the coupler 142 is opened so that the power shank 86 can be placed in the coupler socket; and as soon as the plate 144 is then reclosed and resecured by manipulation of the lever 150 the operator may continue with the crop gathering operation.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination including a tractor, a receptacle mounted on the tractor to be carried thereby, a harvester mounted on wheels and detachably hitched to the tractor to be drawn thereby, and means for conveying harvested crop from the harvester into the receptacle on the tractor.

2. The combination including a tractor, a receptacle disposed over the main body portion of the tractor and supported thereby, an independently supported harvester arranged behind the tractor and detachably connected thereto to be drawn thereby, and means for conveying crop material from the harvester into the tractor receptacle.

3. The combination including a tractor, a receptacle disposed over the main body portion of the tractor and supported thereby, an independently supported harvester arranged behind the tractor and detachably connected thereto to be drawn thereby, and means for conveying crop material from the harvester into the tractor receptacle, said conveying means comprising a transverse conveyor and a longitudinal conveyor.

4. The combination including a tractor, a receptacle disposed over the main body portion of the tractor and supported thereby, an independently supported harvester arranged behind the tractor and detachably connected thereto to be drawn thereby, said harvester having a crop receiving device disposed laterally with respect to the travel path of the tractor, a transverse conveyor for conveying crop material from the crop receiving device to a point behind the tractor, and a longitudinally disposed conveyor for conveying material from the transverse conveyor forwardly into the tractor supported receptacle.

5. The combination including a tractor, a receptacle disposed over the main body portion of the tractor and supported thereby, an independently supported harvester arranged behind the tractor and detachably connected thereto to be drawn thereby, said harvester having a crop receiving device disposed laterally with respect to the travel path of the tractor, and means for conveying crop material from the crop receiving device forwardly up into the tractor receptacle.

6. The combination including a tractor, a receptacle disposed over the main body portion of the tractor and supported thereby, an independently supported harvester connected for trailing movement behind the tractor, and means for conveying crop material from the harvester into the tractor receptacle.

7. The combination including a tractor having an operator's station at its rear, a receptacle carried by the tractor, a harvester hitched to so as to be drawn behind the tractor, a conveyor for conveying harvested crop from the harvester and delivering it to said receptacle, and harvester control means within reach of the operator at said station.

8. The combination including a tractor having an operator's station at its rear, a receptacle carried by the tractor, a harvester hitched to so as to be drawn behind the tractor, a conveyor for conveying harvested crop from the harvester and delivering it to said receptacle, and a skeleton frame work supporting the receptacle over the tractor at a sufficient height to permit the operator on said station to have a substantially unobstructed view forwardly under the receptacle when driving and steering the tractor.

9. The combination including a tractor having an operator's station at its rear, a receptacle carried by and over the tractor at a sufficiently high elevation so as to permit the operator on said station to have a substantially unobstructed view forwardly under the receptacle, a harvester hitched to the tractor for trailing movement therebehind, and a conveyor extending forwardly and upwardly from the harvester for conveying harvested crop into the tractor receptacle.

10. The combination including a tractor having an operator's station at its rear, a receptacle carried by and over the tractor at a sufficiently high elevation so as to permit the operator on said station to have a substantially unobstructed view forwardly under the receptacle, a harvester hitched to the tractor for trailing movement therebehind, and a conveyor extending forwardly and upwardly from the harvester for conveying harvested crop into the tractor receptacle, said harvester having a mechanism for severing the crop from the field and delivering it to said conveyor.

11. The combination including a tractor having an operator's station at its rear, a receptacle carried by and over the tractor at a sufficiently high elevation so as to permit the operator on said station to have a substantially unobstructed view forwardly under the receptacle, a harvester hitched to the tractor for trailing movement therebehind, and a conveyor extending forwardly and upwardly from the harvester for conveying harvested crop into the tractor receptacle, said harvester having a crop removing apparatus disposed laterally with respect to the path of tractor travel.

12. The combination including a tractor having an operator's station at its rear, a receptacle carried by and over the tractor at a sufficiently high elevation so as to permit the operator on said station to have a substantially unobstructed view forwardly under the receptacle, a harvester hitched to the tractor for trailing movement therebehind, and a conveyor extending forwardly and upwardly from the harvester for conveying harvested crop into the tractor receptacle, said harvester having a crop removing apparatus disposed laterally with respect to the path of tractor travel; and means, disposed within reach of the operator at said station, for adjusting said crop removing apparatus.

13. The combination including a tractor, a receptacle carried by the tractor, a harvester hitched to for trailing movement behind the tractor, said harvester having crop removing means and means for conveying the removed crop to the tractor receptacle, and power take-off means for transmitting power from the tractor engine to said crop removing and conveying means.

14. The combination including a tractor, a receptacle carried by the tractor, a harvester hitched to for trailing movement behind the tractor, said harvester having crop removing means and means for conveying the removed crop to the tractor receptacle, and power take-off means for transmitting power from the tractor engine to said crop removing and conveying means, said power take-off means having a releasable connection for severing the power transmitting connection when the harvester is unhitched from the tractor.

15. The combination including a tractor, a receptacle carried by the tractor, a harvester hitched to for trailing movement behind the tractor, said harvester having crop removing means and means for conveying the removed crop to the tractor receptacle, and power take-off means for transmitting power from the tractor engine to said crop removing and conveying means, said power take-off means including a coupling device which is automatically disconnectable when the tractor is unhitched and driven away from the harvester.

16. The combination including a tractor having an operator's station at its rear, a receptacle carried by and over the tractor at a sufficiently high elevation so as to permit the operator on said station to have a substantially unobstructed view forwardly under the receptacle, a wheel supported frame hitched to so as to trail behind the tractor, means carried by the frame for gathering material as the machine moves forwardly, and means for conveying such material into said tractor receptacle.

17. The combination including a tractor, a receptacle carried on the tractor, a harvester supported on wheels independent of the tractor and connected with the tractor to be propelled thereby, said harvester including crop removing means and means for conveying the removed crop to the tractor receptacle, and power take-off means for transmitting power from the tractor engine to said crop removing and conveying means, said power take-off means including a coupling device which is automatically disconnectable when the tractor is disconnected and driven away from the harvester.

18. The combination including a tractor having an operator's station at its rear, a receptacle carried by and over the tractor at a sufficiently high elevation so as to permit the operator on said station to have a substantially unobstructed view forwardly under the receptacle, a wheel supported frame connected to the tractor to be propelled thereby, means carried by the frame for gathering material as the frame moves forwardly under tractor power, and means for conveying such material to said tractor receptacle.

ADOLPH RONNING.